May 12, 1942.     J. M. JENKINS     2,282,476
VALVE MECHANISM
Filed April 1, 1941
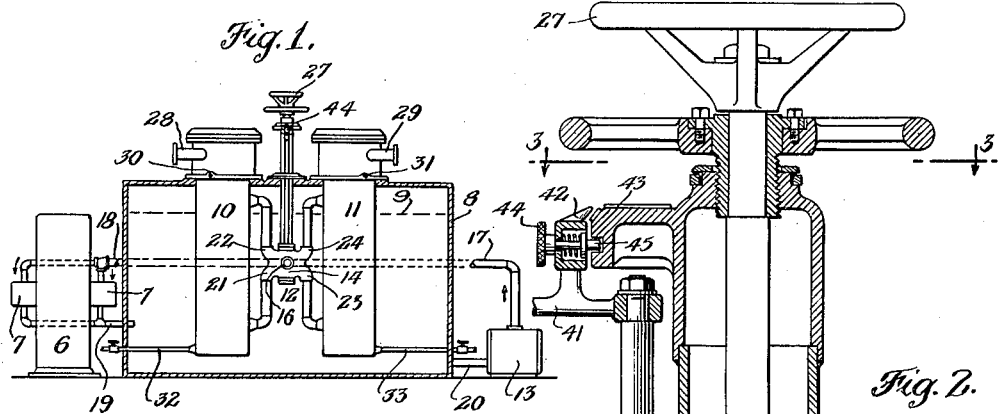
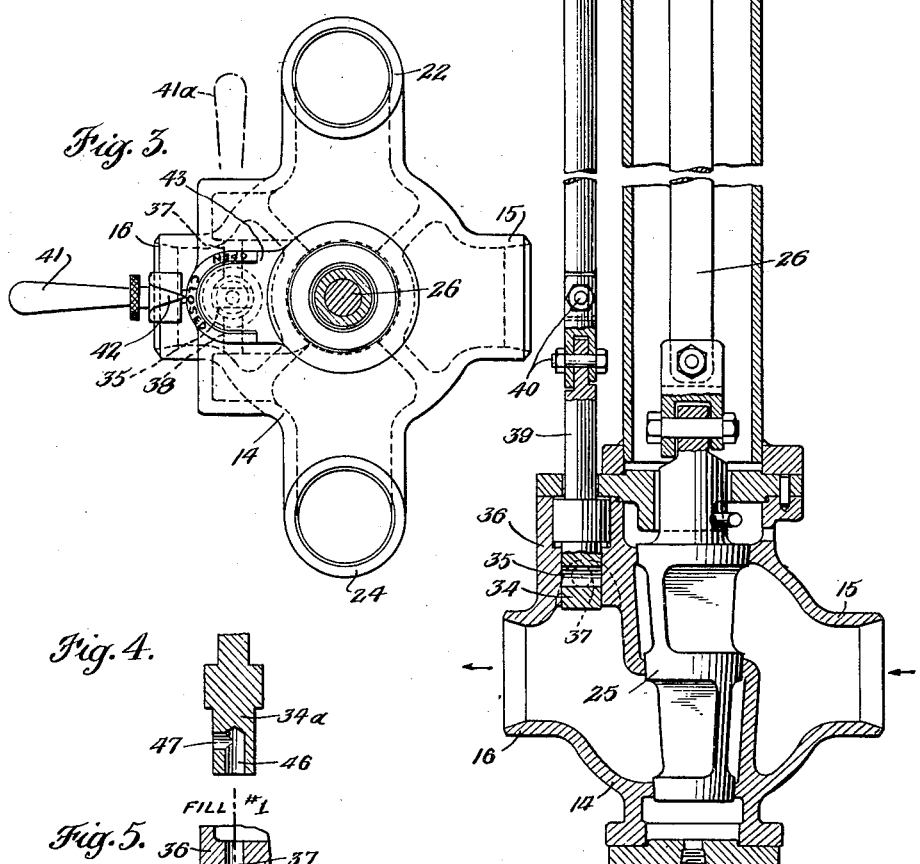
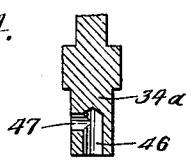
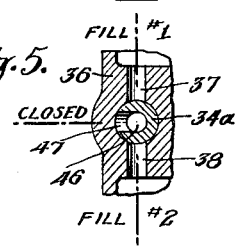
INVENTOR:
James M. Jenkins
BY Symestvedt & Lechner
ATTORNEYS.

Patented May 12, 1942

2,282,476

UNITED STATES PATENT OFFICE 2,282,476

VALVE MECHANISM

James M. Jenkins, Philadelphia, Pa., assignor to Andale Company, Philadelphia, Pa., a corporation of Pennsylvania Application April 1, 1941, Serial No. 386,242

7 Claims. (Cl. 184—104)

This invention relates to valve mechanism, and more particularly to what might be termed a "duplex" valve adapted for use in a fluid circulation system of the type in which the fluid flow is alternatively directed through either one of two channels.

As an example of such a system, reference is made to a circulating and cooling system for the oil used for lubricating the bearings of a turbine. In a system of this type, because of the fact that the turbine must ordinarily be maintained in continuous operation, it is of great importance that the supply of bearing lubricant never be impaired. To this end, the system associated with the turbine bearings incorporates a reservoir of oil, a pair of oil coolers, a circulating pump, and a "duplex" valve by means of which the oil circulated to the turbine bearings may alternatively be caused to pass through either one of the oil coolers.

With equipment of the type above mentioned, either of the oil coolers may be taken out of the circulation system for purposes of cleaning, repair or the like, without necessitating even a momentary shut-off of the oil supply to the bearings, the oil flow being carried through the other cooler. When it is desired to return the flow of oil to a cooler which has been opened for cleaning or the like, it is of great importance that the cooler be refilled with oil before it is placed in the circulation system and relied upon to supply cool oil to the turbine bearings. If this were not done, the flow of oil to the turbine bearings would be terminated during the period of refilling the cooler and air delivered to the turbine bearings.

In certain prior duplex valves (see, for example, the valve disclosed in McNeal Patent No. 2,217,490 issued October 8, 1940), the valve has been so arranged that when it is desired to refill a cooler which has been out of service, the valve may be adjusted to an intermediate position in which a portion of the flow is diverted from the cooler in service to the cooler out of service in order to refill the latter, whereupon the valve may again be adjusted to cause the entire circulation to take place through the cooler which had been out of service.

The present invention contemplates a duplex valve mechanism having improved means for effecting refilling of a cooler which has been out of service. One of the objects of the invention is to make the refilling operation more foolproof, it being of vital concern that the flow of oil to the turbine bearings be maintained.

How the foregoing and other objects and advantages are attained will appear more fully from the following description, referring to the accompanying drawing, in which—

Figure 1 is a somewhat diagrammatic outline view of a turbine and oil circulating and cooling system associated therewith;

Figure 2 is a vertical sectional view through the duplex valve mechanism embodied in the system of Figure 1, the valve mechanism incorporating the improvements of the present invention;

Figure 3 is a view taken as indicated by the section line 3—3 on Figure 2; and

Figures 4 and 5 are vertical and horizontal sectional views, respectively, illustrating a modification of the invention.

In Figure 1 the turbine is indicated at 6, the bearings therefor being shown at 7—7. The system associated with these bearings includes a tank 8 serving as an oil reservoir, the same being indicated as being filled with oil to the level 9. A pair of oil coolers 10 and 11 are in part submerged in the oil in the reservoir 8, and intermediate the coolers is the duplex valve generally indicated at 12. A pump 13 provides the required circulation through the piping connections now to be described.

At the rear and front sides of the valve 12 (when viewed as in Figure 1), the valve casing 14 is provided with primary inlet and outlet connections 15 and 16, the former of which is coupled with the delivery side of pump 13 by means of pipe 17, and the latter of which is connected with the turbine bearings by means of pipe 18, having appropriate branches for delivery of oil to both bearings. Branched discharge pipe 19 serves to return the oil to the reservoir 8. Pump 13 draws oil from reservoir 8 through pipe 20.

The casing 14 of the duplex valve also has two pairs of secondary inlet and outlet connections 21—22 and 23—24. Outlet connection 22 delivers oil to cooler 10, the oil being returned to the valve through inlet connection 21. Similarly, outlet connection 24 delivers oil to the cooler 11, from which the oil is returned to the valve through connection 23.

Within the valve casing is the adjustable plug valve 25 providing alternatively for flow of oil through either one of the coolers 10 and 11. When cooler 10 is in service the flow enters the valve casing through the primary inlet 15 and is delivered to the cooler through the secondary outlet 22, being returned through secondary inlet 21 and thence diverted by the valve member to the primary outlet 16 which, as above mentioned, is coupled with the turbine bearings through pipe 18. When cooler 11 is in service (the valve position illustrated in Figure 2) the flow is from primary inlet 15 to secondary outlet 24 and thence back through secondary inlet 23 and finally out of the primary outlet 16. The manner in which the valve member 25 effects the alternative flow paths need not be considered in detail herein, since that forms no part of the present invention per se. For specific disclosure of an appropriate valve for this purpose reference may be had to the McNeal patent hereinbefore mentioned. The valve is adjustable by means of the operating stem 26 which projects through and above the top wall of reservoir 8, being provided with a hand wheel 27.

Each of the coolers is adapted to receive a bundle of heat transfer tubes through which a cooling medium, such as water, is adapted to be circulated, one water connection being indicated at 28 for cooler 10, and one at 29 for cooler 11. In the particular installation illustrated the oil to be cooled is caused to circulate in the cooler shell around the outer surfaces of the heat exchange tubes. This oil space is provided with a vent (30 for cooler 10 and 31 for cooler 11), and also with a drain (32 for cooler 10 and 33 for cooler 11).

Normally, the drains for the coolers will remain closed, as by plugs or appropriate valves. However, when one of the coolers is to be opened as, for example, for purposes of cleaning, the drain may be opened to partially or completely drain the cooler shell.

For the purpose of refilling such a cooler which has been partially or completely drained, the present invention provides a separately controllable valve associated with the duplex valve. In the form of Figures 1 to 3 inclusive this "filling" valve takes the form of a cylindrical valve member 34 having a single transverse port 35 formed therein, the valve member being housed in an enlargement 36 of the casing. A port 37 (see Figure 3) interconnects the chamber for the filling valve with secondary outlet connection 22 of the duplex valve and a port 38 interconnects the chamber for the filling valve with secondary outlet connection 24 of the duplex valve. Ports 37 and 38 are aligned and are adapted to register with transverse passage 35 in the filling valve, which valve is thus adapted to place secondary outlet connections 22 and 24 in communication with each other.

Adjustment of the filling valve is effected by a stem 39 which is universally jointed at 40 and provided at its upper end with an operating handle 41, the latter carrying a pointer 42 for indicating the position of adjustment. Cooperating indicia, such as "Open" and "Closed" may be placed adjacent the pointer, a bracket 43 being provided for that purpose.

A spring pressed plunger 44 cooperating with recesses such as indicated at 45 in Figure 2, is used to maintain the handle 41 in either of its two positions of adjustment. It will be noted that, in Figure 3, the lever 41 is shown in full lines in closed position and in dot and dash lines (41a) in open position.

In operation, the foregoing mechanism is used as follows:

Assume that cooler 11 is in service (the valve position of Figure 2) and cooler 10 has been opened for purposes of cleaning or the like, the oil being drained from the shell of cooler 10. To refill cooler 10 before returning the circulation thereto, vent 30 is opened and the drain 32, of course, closed. Valve handle 41 is then adjusted to the "open" position (41a in Figure 3) and a small volume of oil is tapped from the secondary outlet connection 24 of the duplex valve and passed through the filling valve to the secondary outlet connection 22. This volume of oil gradually fills the shell of cooler 10, the condition of complete refilling being indicated by an overflow of oil through the vent 30. At this time the vent may be closed if desired, although this need not necessarily be done. Alternatively, a small capacity vent may be utilized and permitted to discharge constantly during all normal operation, so as to ensure the elimination of air or gases. In the event of utilization of a constantly discharging vent the discharge may take place directly to the reservoir 8.

In any event, when the shell of cooler 10 has been completely refilled, the flow may then be diverted therethrough by turning the hand wheel 27 for the duplex valve, thus rotating the valve member 25 to the position in which the primary inlet and outlet connections 15 and 16 are coupled with the secondary outlet and inlet connections 22 and 21 for cooler 10.

In the modification of Figures 4 and 5 the filling valve 34a is of the same general external contour, being adapted to be received in the same chamber in the enlargement 36 of the duplex valve casing. In the modified form, however, the filling valve is provided with an axial bore or passage 46 opening through the lower end of the valve, and also with an inter-communicating radial passage 47 opening through the cylindrical surface of the valve. Passage 47 is adapted alternatively to register with ports 37 and 38, the axial bore 46 being constantly in communication with the chamber in the valve casing 14 adjacent the primary outlet connection 16.

In the arrangement of Figures 4 and 5, therefore, the filling valve is a three-position valve, the intermediate position being "closed," in which no oil is diverted from the system to the cooler out of service. When the operating handle is moved to the position marked "Fill #1," passage 47 registers with port 37, thereby placing the primary inlet connection 16 of the duplex valve in communication with the secondary outlet connection 22 which delivers oil to cooler 10. Similarly, when the operating handle is moved to the position marked "Fill #2," passage 47 registers with port 38, thereby placing the primary inlet connection 16 of the duplex valve in communication with the secondary outlet connection 24 which delivers oil to cooler 11. It will be understood that the indicia "Fill #1" and "Fill #2" and "Closed" may be placed on the bracket 43 in a manner similar to that described above.

With either of the two forms disclosed, the filling valve may be employed to ensure proper refilling of a cooler which has been drained, without the necessity for relying upon a fine adjustment of the duplex valve 25 itself, as was required in certain prior devices where refilling was taken care of by employment of a position of the duplex valve intermediate that providing for flow through one cooler or the other.

The arrangement of Figures 1 to 3 inclusive is perhaps most foolproof, since the filling valve has only two positions and could not through inadvertence be placed in a position to fill one cooler when it was the intention to fill the other.

In considering the appended claims, it is to be kept in mind that the improved valve mechanism of the present invention is especially adapted for use in situations involving alternative flow channels and requiring certainty of refilling one channel or the other prior to the time it is placed in active service. Thus, while the invention is especially adapted to an oil circulating and cooling system of the type described, it is not necessarily limited thereto.

As to the circulation system, moreover, it should be kept in mind that various elements of the system, such as the coolers, the pump, the reservoir, the turbine bearings (or equivalent point of use) may be hooked up in a different sequence than that specifically illustrated and described herein.

I claim:

1. For an oil circulating and cooling system or the like incorporating an oil supply and a pair of oil coolers each having means for draining oil therefrom, a valve casing associated with said system and having primary inlet and outlet connections adapted to be connected in series with said supply and with a point of use, and further having two pairs of secondary inlet and outlet connections for circulating oil to the coolers, controllable valve mechanism in said casing providing for alternative circulation through either one of said coolers, and separately controllable valve means in said casing for refilling either one of said coolers after oil has been drained therefrom.

2. A construction in accordance with claim 1 in which the separately controllable valve means is adapted to interconnect secondary connections for the respective coolers.

3. A construction in accordance with claim 1 in which the separately controllable valve means is adapted to interconnect the secondary outlet connections of the valve.

4. A construction in accordance with claim 1 in which the separately controllable valve means is adapted to interconnect one of said primary connections alternatively with a secondary connection for either cooler.

5. A construction in accordance with claim 1 in which the separately controllable valve means is adapted to interconnect said primary outlet connection alternatively with a secondary connection for either cooler.

6. A construction in accordance with claim 1 in which the valve casing is adapted alternatively to receive and cooperate with either one of two types of separately controllable valve means, one of which is adapted to interconnect secondary connections for the respective coolers and the other of which is adapted to interconnect one of said primary connections alternatively with a secondary connection for either cooler.

7. For an oil circulating and cooling system or the like incorporating an oil supply and a pair of oil coolers each having means for draining oil therefrom, controllable valve mechanism providing for flow of oil from said supply alternatively through either one of said coolers and to a point of use, and separately controllable valve means for refilling either one of said coolers after oil has been drained therefrom, the valve mechanism and valve means being mounted in common and arranged for unitary installation in and removal from the circulating system.

JAMES M. JENKINS.